(12) United States Patent
O'Dell et al.

(10) Patent No.: US 9,944,407 B2
(45) Date of Patent: Apr. 17, 2018

(54) METHODS AND SYSTEMS FOR AVOIDING A COLLISION BETWEEN AN AIRCRAFT AND AN OBSTACLE USING A THREE DIMENSIONAL VISUAL INDICATION OF AN AIRCRAFT WINGTIP PATH

(71) Applicant: Gulfstream Aerospace Corporation, Savannah, GA (US)

(72) Inventors: Robert O'Dell, Savannah, GA (US); Frank Manochio, Savannah, GA (US); Jason Meade, Savannah, GA (US); Michael Boost, Tucson, AZ (US); Jamie Clive Marshall, Tucson, AZ (US)

(73) Assignee: Gulfstream Aerospace Corporation, Savannah, GA (US)

( * ) Notice: Subject to any disclaimer, the term of this patent is extended or adjusted under 35 U.S.C. 154(b) by 181 days.

(21) Appl. No.: 14/855,505

(22) Filed: Sep. 16, 2015

(65) Prior Publication Data
US 2016/0083111 A1 Mar. 24, 2016

Related U.S. Application Data

(60) Provisional application No. 62/053,295, filed on Sep. 22, 2014.

(51) Int. Cl.
*B64D 47/08* (2006.01)
*G02B 27/01* (2006.01)
(Continued)

(52) U.S. Cl.
CPC ............ *B64D 47/08* (2013.01); *B64C 23/069* (2017.05); *G06K 9/00624* (2013.01);
(Continued)

(58) Field of Classification Search
CPC ...... B64C 23/065; G08G 5/045; G08G 5/065; G08G 5/0021; H04N 7/181; G02B 27/01; G06K 9/00624
(Continued)

(56) References Cited

U.S. PATENT DOCUMENTS 6,118,401 A 9/2000 Tognazzini
6,571,166 B1 5/2003 Johnson et al.
(Continued)

FOREIGN PATENT DOCUMENTS

WO 2009075648 A1 6/2009
WO 2013181314 A1 12/2013

OTHER PUBLICATIONS

Utility U.S. Appl. No. 14/053,380, filed Oct. 14, 2013.
(Continued)

*Primary Examiner* — Hee-Yong Kim
(74) *Attorney, Agent, or Firm* — LKGlobal | Lorenz & Kopf, LLP

(57) ABSTRACT

The disclosed embodiments relate to methods and systems for avoiding a collision between an aircraft on the ground and an obstacle using a three-dimensional visual indication of the area or plane of winglets on the wingtips of the aircraft. The method includes receiving a video image from a camera positioned in one of the winglets, the video image representing a field of view through which the winglet of the aircraft will pass along a present heading of the aircraft. Next a processor determines a three-dimensional area or plane within the field of view through which the winglet of the aircraft will pass. An overlay is displayed within the field of view to assist the pilot in avoiding collisions with obstacles within the field of view.

17 Claims, 5 Drawing Sheets

(51) Int. Cl.
  *H04N 7/18* (2006.01)
  *G08G 5/04* (2006.01)
  *G08G 5/06* (2006.01)
  *B64D 45/00* (2006.01)
  *G06K 9/00* (2006.01)
  *G08G 5/00* (2006.01)
  *B64C 23/06* (2006.01)

(52) U.S. Cl.
  CPC ......... *G08G 5/0021* (2013.01); *G08G 5/0078* (2013.01); *G08G 5/045* (2013.01); *G08G 5/065* (2013.01); *H04N 7/181* (2013.01)

(58) Field of Classification Search
  USPC ....................................................... 348/144
  See application file for complete search history.

(56) References Cited

U.S. PATENT DOCUMENTS

| | | |
|---|---|---|
| 7,257,486 B2 | 8/2007 | Shimazaki et al. |
| 7,382,284 B1 | 6/2008 | Armstrong et al. |
| 7,623,044 B2 | 11/2009 | Pepitone et al. |
| 8,121,786 B2 | 2/2012 | Morbey et al. |
| 8,836,538 B2 | 9/2014 | Ma et al. |
| 2003/0137426 A1 | 7/2003 | Anthony et al. |
| 2007/0182589 A1 | 8/2007 | Tran |
| 2009/0182506 A1 | 7/2009 | Yun |
| 2013/0110323 A1 | 5/2013 | Knight |
| 2013/0321176 A1 | 12/2013 | Vasek et al. |
| 2014/0240313 A1 | 8/2014 | Varga |
| 2014/0288815 A1 | 9/2014 | Bousquet et al. |
| 2014/0330454 A1* | 11/2014 | Purpura ................. B64D 45/00 701/3 |
| 2015/0045994 A1 | 2/2015 | Krishna et al. |
| 2015/0106005 A1* | 4/2015 | Wischmeyer .......... G08G 5/065 701/301 |

OTHER PUBLICATIONS

USPTO, Office Action in U.S. Appl. No. 14/053,380 dated Apr. 10, 2015.
USPTO, Office Action in U.S. Appl. No. 14/053,380 dated Jul. 30, 2015.
United States International Searching Authority, International Search Report and Written Opinion for International Application No. PCT/US15/50346 dated Dec. 15, 2015.
The International Bureau of WIPO, International Preliminary Report on Patentability for International Application No. PCT/US2015/050346 dated Apr. 6, 2017.

* cited by examiner

METHODS AND SYSTEMS FOR AVOIDING A COLLISION BETWEEN AN AIRCRAFT AND AN OBSTACLE USING A THREE DIMENSIONAL VISUAL INDICATION OF AN AIRCRAFT WINGTIP PATH

RELATED APPLICATION

This application claims the benefit of U.S. Provisional Application No. 62/053,295 filed Sep. 22, 2014.

TECHNICAL FIELD

Embodiments of the present invention generally relate to aircraft, and more particularly relate to methods and systems for avoiding collisions between an aircraft on a ground surface and an obstacle.

BACKGROUND OF THE INVENTION

An operator of an aircraft must often maneuver the aircraft while on the ground. This may happen during ground operations such as when the aircraft is taxiing, being maneuvered to or from a hangar, or backing an aircraft away from a terminal.

Obstacles on the ground, such as structures, other aircraft, vehicles and other obstacles, may lie in the path of a taxing aircraft. Operators are trained to detect these obstacles using their sense of sight. However, in many cases, due to the dimensions of the aircraft (e.g., large wing sweep angles, distance from cockpit to wingtip and winglets on the wingtip) and the operator's limited field of view of the areas surrounding the aircraft, it can be difficult for an operator to monitor extremes of the aircraft during ground operations. As a result, the operator may fail to detect obstacles that may be in the path of the wingtips or winglets of the aircraft. In many cases, the operator may only detect an obstacle when it is too late to take evasive action needed to prevent a collision with an obstacle.

Collisions with an obstacle can not only damage the aircraft, but can also put the aircraft out of service and result in flight cancellations. The costs associated with the repair and grounding of an aircraft can be significant. As such, the timely detection and avoidance of obstacles that lie in the ground path of an aircraft is an important issue that needs to be addressed.

Accordingly, it is desirable to provide methods, systems and apparatus that can reduce the likelihood of and/or prevent collisions between aircraft and obstacles. It would also be desirable to assist the operator with maneuvering the aircraft and to provide an operator with aided guidance while maneuvering the aircraft so that collisions with such obstacles can be avoided. It would also be desirable to provide technologies that can be used to detect obstacles on the ground and identify an aircraft's predicted position with respect to the detected obstacles. It would also be desirable to provide the operator with an opportunity to take appropriate steps to avoid a collision from occurring between the aircraft and the detected obstacles. Furthermore, other desirable features and characteristics of the present invention will become apparent from the subsequent detailed description and the appended claims, taken in conjunction with the accompanying drawings and the foregoing technical field and the foregoing technical field and background.

SUMMARY

In one embodiment, a method is provided for avoiding a collision between an aircraft on a ground surface and an obstacle using a three-dimensional visual indication of the area or plane of winglets on the wingtips of the aircraft. The method includes receiving a video image from a camera positioned in one of the winglets, the video image representing a field of view through which the winglet of the aircraft will pass along a present heading of the aircraft. Next a processor determines a three-dimensional area or plane within the field of view through which the winglet of the aircraft will pass. An overlay is displayed within the field of view to assist the pilot in avoiding collisions with obstacles within the field of view.

In another embodiment, a system is provided for avoiding a collision between an aircraft on a ground surface and an obstacle using a three-dimensional visual indication of the area or plane of winglets on the wingtips of the aircraft. The system includes a camera positioned in one of the winglets and a processor for processing a video image from the camera representing a field of view through which the winglet of the aircraft will pass along a present heading of the aircraft. The processor determines a three-dimensional area or plane within the field of view through which the winglet of the aircraft will pass and generates a representative overlay. The overlay is displayed within the field of view to assist the pilot in avoiding collisions with obstacles within the field of view.

DESCRIPTION OF THE DRAWINGS

Embodiments of the present invention will hereinafter be described in conjunction with the following drawing figures, wherein like numerals denote like elements.

DESCRIPTION OF EXEMPLARY EMBODIMENTS

As used herein, the word "exemplary" means "serving as an example, instance, or illustration." The following detailed description is merely exemplary in nature and is not intended to limit the invention or the application and uses of the invention. Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims. Furthermore, there is no intention to be bound by any expressed or implied theory presented in the preceding technical field, background, summary or the following detailed description.

Figure 1A:
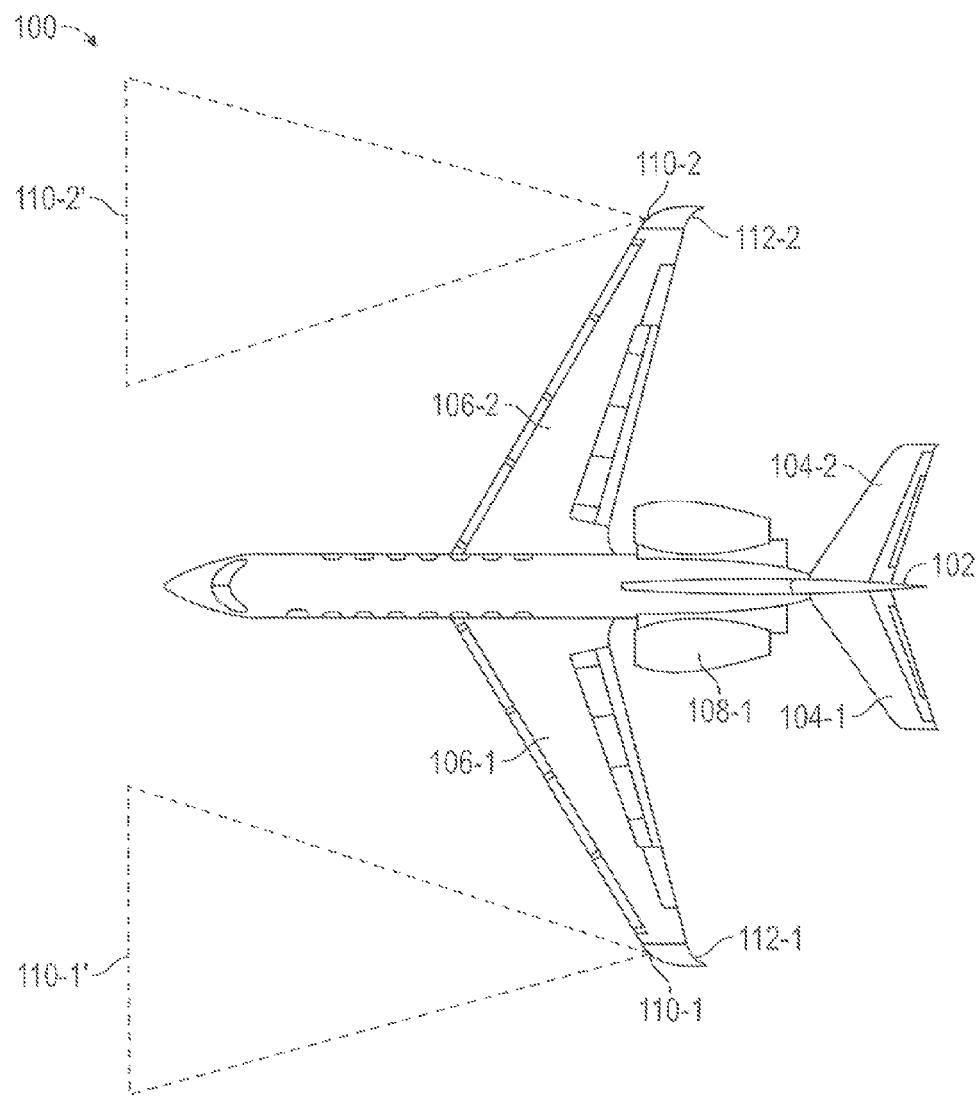
FIGS. 1A-1D are illustrations of an aircraft in accordance with an embodiment.
Figure 1B:
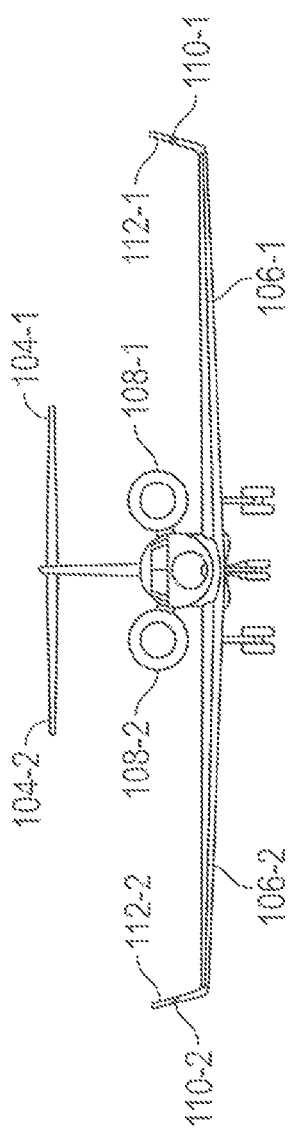

FIGS. 1A and 1B, illustrate an aircraft 100 that includes instrumentation for implementing a three-dimensional optical winglet monitoring system in accordance with some embodiments. As will be described below, the three-dimensional winglet monitoring system can be used to reduce or eliminate the likelihood of a collision between an aircraft 100 with obstacles that are in the winglet path of the aircraft 100 when the aircraft is taxiing.

In accordance with one non-limiting embodiment, the aircraft 100 includes a vertical stabilizer 102, two horizontal stabilizers 104-1 and 104-2, two main wings 106-1 and 106-2, two jet engines 108-1, 108-2. Although the jet engines 108-1, 108-2 are illustrated as being mounted to the fuselage, this arrangement is non-limiting and in other implementations the jet engines 108-1, 108-2 can be mounted on the wings 106-1, 106-2. Each of the main wings 106-1 and 106-2 include winglets 112-1 and 112-2 positioned at a wingtip and angled upwardly from each wingtip. As will be appreciated, winglets improve the efficiency of fixed-wing aircraft by increasing the lift generated at the wingtip that reduces lift-induced drag caused by wingtip vortices. This improves the lift-to-drag ratio and increases fuel efficiency of the aircraft thus increasing range. The aircraft 100 also includes an obstacle/ground traffic detection system that includes cameras 110-1, 110-2 that are positioned in the winglets 112-1 and 112-2 of the aircraft 100.

The cameras 110-1, 110-2 are used to acquire video images of a field of view (FOV) 110-1', 110-2'. In some embodiments, the cameras 110-1, 110-2 are video cameras capable of acquiring video images with the FOV at a selected frame rate (e.g., thirty frames per second). In some embodiments, the cameras 110-1, 110-2 are still image cameras that can be operated at a selected or variable image capture rate according to a desired image input rate. Additionally, the cameras 110-1, 110-2 may be implemented using cameras such as high-definition cameras, video with low-light capability for night operations and/or cameras with infrared (IR) capability, etc. In some embodiments, multiple cameras may be employed and the respective FOVs combined or "stitched" together using convention virtual image techniques.

In some embodiments, the FOVs 110-1', 110-2' may vary depending on the implementation and design of the aircraft 100 so that the FOV can be varied either by the operator (pilot) or automatically depending on other information. In some embodiments, the FOVs 110-1', 110-2' of the cameras can be fixed, while in others it can be adjustable. For example, in one implementation, the cameras 110-1, 110-2 may have a variable focal length (i.e., a zoom lens) which can be modified to vary the FOV 110-1', 110-2'. Thus, this embodiment can vary the range and field of view based on the surrounding area and/or the speed of the aircraft so that the location and size of the space within the FOV 110-1', 110-2' can be varied. When the cameras 110-1, 110-2 have an adjustable FOV, a processor (not illustrated in FIGS. 1A-1B) can command the camera lens to a preset FOV. The optical range of the cameras 110-1, 110-2 can also vary depending on the implementation and design of the aircraft 100.

According to exemplary embodiments, the winglet cameras 110-1 and 110-2 provide FOV images to a processor. By knowing the position of the winglet cameras in relation to the size and angle of the winglets, an onboard computer can determine the three-dimensional area (or plane) through which the winglets of the aircraft will travel. As used here, an onboard computer means any computer, processor or processing system residing anywhere onboard the aircraft 100. Non-limiting examples include processors residing: in the cameras 110-1 and 110-2; in the display 212; in a dedicated video processor; in a flight control system or in a cabin server. The onboard processor may be a single processor, a core of a multi-core processor or a processor from a distributed processing system within the aircraft 100. Using this information, the onboard process creates an overlay image is provided to be displayed with the video image from the cameras 110-1, 110-2. The combined image provides an operator (e.g., pilot) with a visual indication of the winglet path through the FOV, and any obstacles that may collide with the wings (or wingtips) can be seen by the operator to safely avoid collision with the obstacle. In some embodiments, the size and angle of the overlay is selected to match the space that the winglet (from tip to base) will travel through the FOV. In this way, aircraft safety is promoted by providing information to assist in avoiding obstacles while the aircraft 100 is taxiing.

Figure 1D:
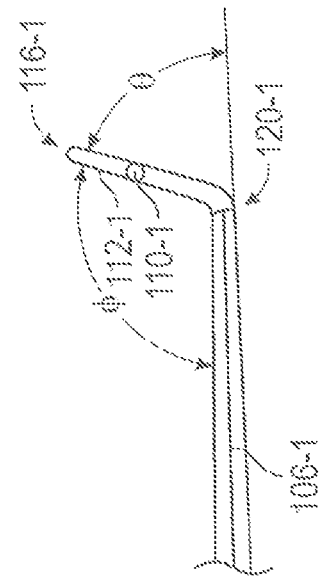
Figure 1C:
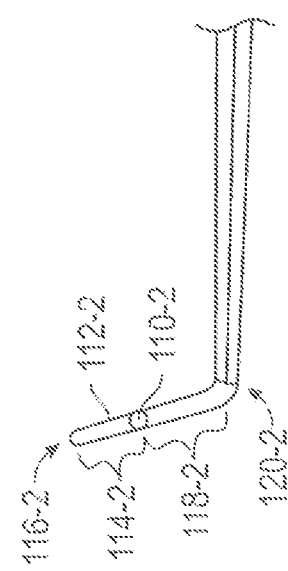

FIG. 1C illustrates one example of the winglet camera 110-2 positioned approximately midway in the winglet 112-2. The distance 114-2 from the camera 110-2 to the winglet tip 116-2 can be determined as well as a distance 118-2 from the camera 110-2 to the winglet base 120-2. This information can be stored in an on-board computer or processor in the aircraft and used to determine the area or plane in which the winglet will pass. Similarly in FIG. 1D, the angle Ø from the main wing 106-1 to the winglet tip 116-1 can be determined to provide the angle that the winglet 112-1 projects from the main wing 106-1. Alternately, an angle θ can be determined from the winglet tip 116-1 to a projected line from the wingtip base 120-1 to provide the angle that the winglet 112-1 projects from the wingtip of the main wing 106-1. The processor uses the angle of the winglet from the wingtip to determine the angle of the plane that the winglet will pass through. That is, since the processor has the distal relationship of the winglet to the camera and the angular information of the winglet to the wing the processor can determine a three-dimensional area through which the winglet will pass within the FOV as the aircraft advances along a current heading. Accordingly, a video overlay can be produced that represents the area or plane that the winglet would pass through at a future time as the aircraft continued on the present heading. The overlay can be presented to the pilot with the video image of the FOV enabling the pilot to observe obstacles in relation to the overlay including a determination of whether the winglet may pass over or under the obstacle without making contact if the overlay is calibrated to represent the tip and base of the winglet.

Figure 2:
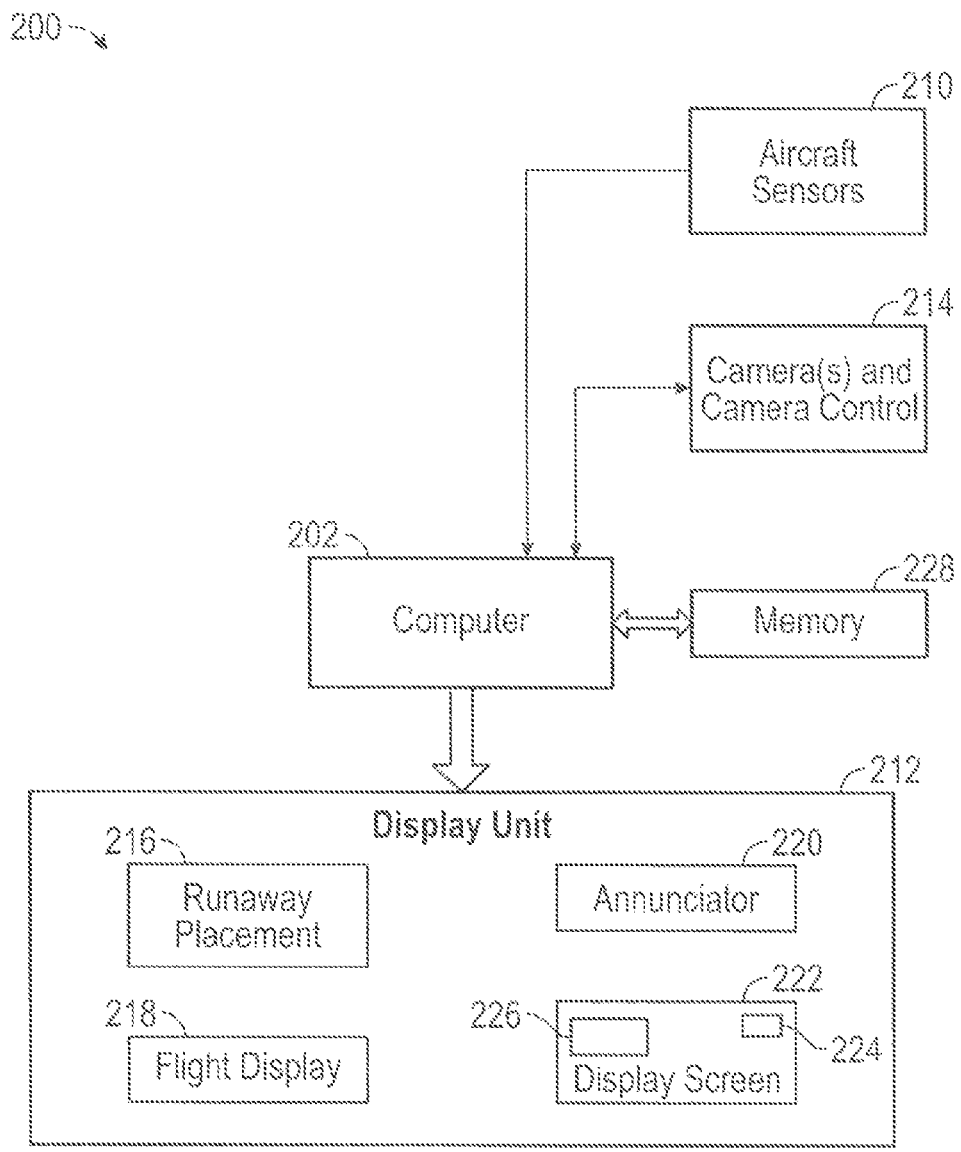
FIG. 2 is a block diagram of collision alerting system in accordance with an embodiment.

FIG. 2 is block diagram of various systems 200 for an aircraft 100 that implements an optical wingtip monitoring system and/or is capable of an optical wingtip monitoring method in accordance with exemplary embodiments. The fundamental control systems 200 include a computer 202, cameras and camera control 214, memory 228 and a display unit 212.

Accordingly to exemplary embodiments, the cameras 110-1, 110-2 and camera control 214 provide raw or processed camera images to the computer 202. In some embodiments, raw images can be sent to the computer 202 for processing in a software embodiment. In some embodiments, hardware, firmware and/or software process the raw image data via the camera control 214 and provide processed image data to the computer 202. In some embodiments, raw images can be sent to the display 212 for processing in a processor resident in the display 212. In other embodiments, the camera control 214 can be configured to send processed image data directly to the display 212. Optionally, aircraft sensors 210 may include a plurality of sensors including active proximity or collision detection systems.

The display unit 212 displays information regarding the status of the aircraft including the FOVs from the cameras 110-1, 110-2 and the overlays. The display unit 212 typically also includes, but is not limited to an annunciator 220 to provide verbal warnings, alert or warning tones or other audible information. The display screen 222 of the display unit 212 may include pilot head-up display, traffic collision avoidance display or other displays as may be included in any particular embodiment. Some displays 222 include icons 224 that are illuminated to indicate the occurrence of certain conditions and/or a text message screen 226 to display text information.

In accordance with one embodiment, the various aircraft systems 200 illustrated in FIG. 2 is implemented with software and/or hardware modules in a variety of configurations. For example, computer 202 comprises a one or more processors, software module or hardware modules. The processor(s) reside in single integrated circuits, such as a single or multi-core microprocessor, or any number of integrated circuit devices and/or circuit boards working in cooperation to accomplish the functions of the computer 202. The computer 202 is operable coupled to a memory system 228, which may contain the software instructions or data for the computer 202, or may be used by the computer 202 to store information for transmission, further processing or later retrieval. In accordance with one embodiment, the memory system 228 is a single type of memory component, or composed of many different types of memory components. The memory system 228 can include non-volatile memory (e.g., Read Only Memory (ROM), flash memory, etc.), volatile memory (e.g., Dynamic Random Access Memory (DRAM)), or some combination of the two. In an embodiment, the three-dimensional obstacle avoidance system is implemented in the computer 202 via a software program stored in the memory system 228.

Once the predicted three-dimensional area or plane of the wingtips has been determined and the overlays generated can be presented (albeit in a two-dimensional format) to the aircraft operator on the display 212.

Figure 3:
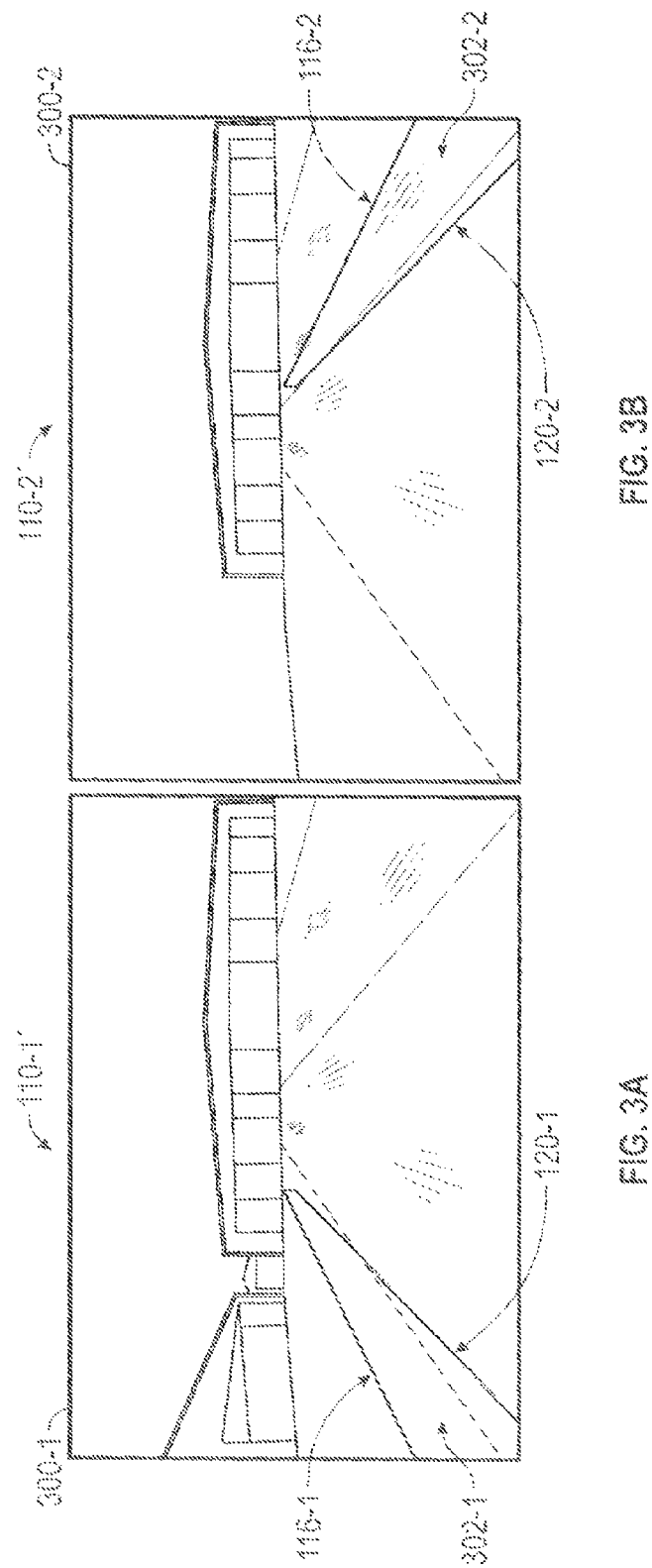
FIGS. 3A-3B are illustrations of displays of an aircraft in accordance with an embodiment.

FIGS. 3A-3B are illustrations of exemplary cockpit displays that could be employed in any particular implementation. The displays 300-1 and 300-2 present the overlays 302-1, 302-2 within the FOVs 110-1' and 110-2'. In the illustrated example, the overlays 302-1 and 302-2 have a shape representing the area or plane through which the winglet will pass within the field of view, with the upper portion representing the winglet tip 116-2 and the lower portion representing the winglet base 120-2. The overlays 302-1 and 302-2 appear at an angle corresponding to the angle of the winglet from the main wing as discussed above in connection with FIG. 3-D. In other embodiments, a more general shape (e.g., rectangle) could be used albeit with the loss of information regarding the winglet height and angle in relation to any obstacle within the rectangle. The overlays 302-1 and 302-2 may appear as tapering lines representing the position (height and angle) within the field of view at a future point in time along the present heading of the aircraft. In some embodiments, the overlays 302-1 and 302-2 may appear as a line-image (e.g., tapering rectangle) having a transparent area, while in other embodiments the area within the overlay may be tinted with a translucent color. Additionally, the overlays may be presented with various combinations of symbols, graphics or alphanumeric characters as desired in any particular embodiment. Optionally, various portions of the area within the overlays could include a multi-color feature, such as, for example, a green color, amber color or a red color depending upon the ground speed of the aircraft with the color relating to the amount of time a pilot would have to avoid an obstacle at the present ground speed.

The embodiments in which the overlay includes an upper portion representing the tip of the winglet and the lower portion representing the base of the winglet offer an advantage to the pilot and that the pilot can determine whether the winglet a pass over an obstacle (e.g., vehicle) or under an obstacle (e.g., hanger door). As the aircraft changes heading during the taxi maneuver, the overlays follow the field of image changes so that the pilot can at all times determine the area or plane through which the winglet will pass or travel within the field of view.

In some embodiments, the displays and overlays illustrated in FIGS. 3A-3B are activated by the pilot prior to beginning a taxi maneuver. In other embodiments, the displays and overlays could be presented automatically upon detecting motion of the aircraft from a stopped position until deactivated by the pilot prior to performing a takeoff maneuver. Additionally, one display may be deactivated if the pilot is confident that there are no obstacles within that FOV (for example, the starboard FOV). This allows the display to be used to present other data or information desired by the pilot during taxing the aircraft. Additionally, following a landing maneuver, the displays and overlays could be activated by the pilot or automatically upon the aircraft falling below a certain ground speed.

Figure 4:
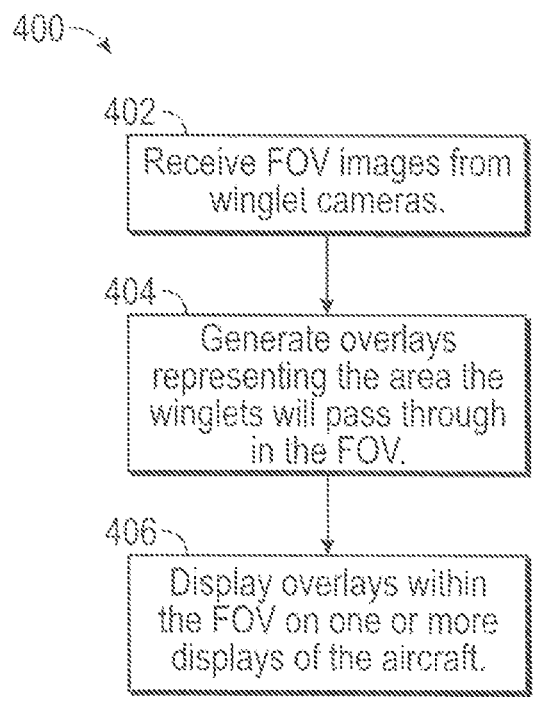
FIG. 4 is a flowchart of a method in accordance with an embodiment.

FIG. 4 is a flowchart of a method 400 illustrating the steps performed by the The various tasks performed in connection with the method 400 of FIG. 4 may be performed by software executed in a processing unit, hardware, firmware, or any combination thereof. For illustrative purposes, the following description of the method 400 of FIG. 4 may refer to elements mentioned above in connection with FIGS. 1-3. In practice, portions of the method of FIG. 4 may be performed by different elements of the described system. It should also be appreciated that the method of FIG. 4 may include any number of additional or alternative tasks and that the method of FIG. 4 may be incorporated into a more comprehensive procedure or process having additional functionality not described in detail herein. Moreover, one or more of the tasks shown in FIG. 4 could be omitted from an embodiment of the method 400 of FIG. 4 as long as the intended overall functionality remains intact.

The routine begins in step 402, where video images is received from the cameras (110-1, 110-2 in FIG. 1A) to provide winglet FOVs 110-1' and 110-2'. In step 404, the overlays are generated that indicate a predicted area or plane the winglets will take through the FOVs 110-1' and 110-2'. In step 406, the overlays are displayed within the FOVs (110-1', 110-2' in FIG. 1A) as illustrated in FIGS. 3A-3B. The display may be a conventional cockpit screen display, a head-up display, or a display at or onboard towing equipment towing the aircraft. Optionally, the overlays may be presented via color features or with other information.

The disclosed methods and systems provide a three-dimensional optical winglet monitoring system for an aircraft that enhances safe ground travel for an aircraft by an operator with a visual indicator of the area or plane of the wingtips relative to the present heading of the aircraft as being directed by the operator. This allows the operator an opportunity to identify potential collisions in time to avoid the collision for the safety of the aircraft and convenience of the passengers.

It will be appreciated that the various illustrative logical blocks/tasks/steps, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The word "exemplary" is used exclusively herein to mean "serving as an example, instance, or illustration." Any embodiment described herein as "exemplary" is not necessarily to be construed as preferred or advantageous over other embodiments.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for avoiding a collision between an aircraft on a ground surface and an obstacle, the aircraft having winglets positioned at the wingtips, the method comprising:
   receiving, at the processor onboard an aircraft, a video image from a camera positioned in one of the winglets, the video image representing a field of view through which the wingtip of the aircraft will pass along a present heading of the aircraft;
   determining, by the processor, a predicted three-dimensional area representing the height of the winglet and the angle of the winglet from the wingtip within the field of view through which the winglet of the aircraft will pass along the present heading of the aircraft; and
   displaying the video image on a display together with an overlay representing the predicted three-dimensional area in the field of view;
   wherein the overlay provides information to assist in preventing the winglet of the aircraft from colliding with obstacles in the field of view.

2. The method of claim 1, wherein displaying comprises displaying the video image and the overlay on a display within the aircraft.

3. The method of claim 1, wherein displaying comprises displaying the video image and the overlays on a head-up display.

4. The method of claim 1, wherein the overlay has an upper portion representing the tip of the winglet and a lower portion representing a base of the winglet.

5. The method of claim 1, wherein the overlay is displayed is a line-image within the field of view.

6. The method of claim 1, wherein the overlay is displayed as a translucent color image within the field of view.

7. A method for avoiding a collision between an aircraft on a ground surface and an obstacle, the aircraft having winglets positioned at the wingtips, the method comprising:
   receiving, at the processor onboard an aircraft, a first video image from a first camera, the first video image representing a first field of view from a first winglet of the aircraft;
   receiving, at the processor onboard an aircraft, a second video image from a second camera, the second video image representing a second field of view from a second winglet of the aircraft;

determining, by the processor, a first three-dimensional area through which the first winglet of the aircraft will travel and a second three-dimensional area through which the second winglet of the aircraft will travel within the field of view along a present heading of the aircraft the first and second three-dimensional areas each having a shape representing the respective height of the first and second winglet and the angle of the first and second winglet from a respective wing coupled to the first and second winglet; and displaying the first video image on a display together with an overlay representing the first three-dimensional area in the first field of view, and the second video image on the display together with an overlay representing the second three-dimensional area in the second field of view;

wherein the first and second overlays provide information to assist in preventing the aircraft from colliding with obstacles in the first and second field of views.

8. The method of claim 7, wherein displaying comprises displaying the first and second video images and the first and second overlays on a display within the aircraft.

9. The method of claim 7, wherein displaying comprises displaying the first and second video images and the first and second overlays on a head-up display.

10. The method of claim 7, wherein the first and second overlays have an upper portion representing the tip of the respective first and second winglet and a lower portion representing a respective base of the first and second winglet.

11. The method of claim 7, wherein displaying the first and second overlays are displayed is line-images within the respective first and second field of view.

12. The method of claim 7, wherein displaying the first and second overlays comprises displaying a translucent color images within the respective first and second field of views.

13. An aircraft, comprising:

a first wing having a first winglet positioned at a first wing tip, the first winglet have a camera positioned therein for providing a first video image of a first winglet field of view;

a second wing having a second winglet positioned at a second wing tip, the second winglet have a second camera positioned therein for providing a second video image of a second winglet field of view;

processor for determining a respective first and second three-dimensional area for the first and second wingtip to travel within the wingtip field of view along a present heading of the aircraft and for generating a first and second overlay representing the first and second three-dimensional area, the first and second overlays have an upper portion representing the tip of the respective first and second winglet and a lower portion representing a respective base of the first and second winglet; and a display for displaying the first and second video image and the first and second overlay to provide information to assist in avoiding obstacles.

14. The aircraft according to claim 13, wherein the display comprises a cockpit mounted display within the aircraft.

15. The aircraft according to claim 13, wherein the display comprises a heads-up display within the aircraft.

16. The method of claim 13, wherein displaying the first and second overlays are displayed is line-images within the respective first and second field of view.

17. The method of claim 13, wherein displaying the first and second overlays comprises displaying a translucent color images within the respective first and second field of views.

* * * * *